United States Patent [19]

King

[11] Patent Number: 4,567,921

[45] Date of Patent: Feb. 4, 1986

[54] HIGH TEMPERATURE PRESSURE SENSING INSTRUMENT AND METHOD

[75] Inventor: Lance M. King, Garden Grove, Calif.

[73] Assignee: V.E. Kuster Company, Long Beach, Calif.

[21] Appl. No.: 616,276

[22] Filed: Jun. 1, 1984

[51] Int. Cl.⁴ .............................................. B65B 3/04
[52] U.S. Cl. ........................................ 141/5; 141/7; 141/8; 141/11; 141/82
[58] Field of Search .................................... 141/1–12, 141/94, 95, 96, 192–198, 250–284, 82, 37–66

[56] References Cited

U.S. PATENT DOCUMENTS 3,911,972 10/1975 Hübers et al. .......................... 141/7

FOREIGN PATENT DOCUMENTS 368349 5/1963 Switzerland ............................. 141/7

Primary Examiner—Houston S. Bell, Jr.
Attorney, Agent, or Firm—Hubbard, Stetina and Brunda

[57] ABSTRACT

This invention relates to apparatus and methods for filling a conventional Bourdon tube with an outgassed fluid to permit use of the Bourdon tube to measure fluid pressures at high temperatures. The filling device includes a hot reservoir containing hydraulic fluid that has been heated to facilitate outgassing and a cold reservoir in fluid communication with the hot reservoir to prevent exposure of the fluid in the hot reservoir to oxygen. A vacuum line connected to the cold reservoir permits evacuation of the filling apparatus, the Bourdon tube and a typical bellows that may be attached to the Bourdon tube. The bellows is mechanically compressed and provided with a center post to reduce the volume of the bellows by about fifty percent. After the Bourdon tube, the bellows and the hydraulic fluid in the hot reservoir have been heated and outgassed, the vacuum is removed from the cold reservoir to permit hydraulic fluid to flow from the hot reservoir into the bellows and Bourdon tube. After the Bourdon tube and bellows are filled, the filling apparatus is disconnected from the fill port, which is then plugged to prevent leakage.

14 Claims, 2 Drawing Figures

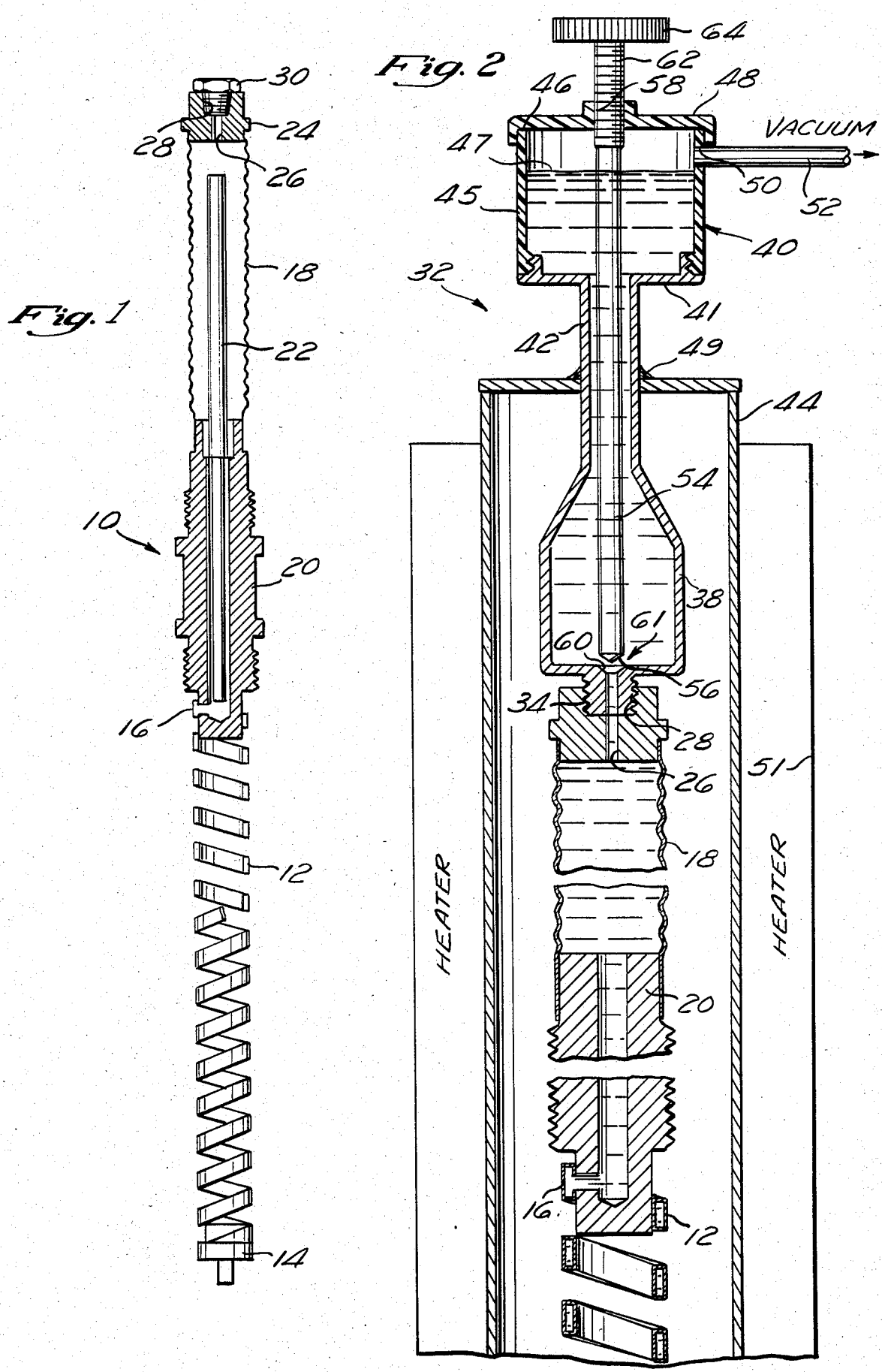

HIGH TEMPERATURE PRESSURE SENSING INSTRUMENT AND METHOD

BACKGROUND OF THE INVENTION

This invention is related to the measurement of bottom hole pressures in deep bore holes in the earth. More particularly, this invention relates to the apparatus and method for filling a conventional type of Bourdon tube pressure measuring instrument with a fluid for communicating well fluid pressure to the Bourdon tube to enable the Bourdon tube to measure well fluid pressures at high temperatures.

It is well known in the art to use a Bourdon tube enclosed in a tubular housing for measuring bottom hole pressures in deep bore holes in the earth. A typical pressure measuring instrument comprises three separate sections. One section includes a recording device in which a sharp jeweled stylus scratches a line trace on the surface of a cylindrical sheet to make a record of the sensed pressure as a function of time. The second section is a pressure sensing section which generally includes a long helically wound Bourdon tube of many terms anchored at its bottom end and fastened to the recording stylus at the upper end. Pressure changes in the hydraulic fluid inside the Bourdon tube cause the upper end to rotate with respect to the fixed bottom end and, therefore, to rotate the stylus against the recording chart. A clock driven mechanism in the recording section moves the chart longitudinally so that a continuous curve is drawn of the pressure as a function of time. The third section of the instrument is devoted to means for contacting the well fluids and transmitting the pressure of the well fluids to the hydraulic liquid in the Bourdon tube. U.S. Pat. No. 3,744,307 to Harper, et al. describes a typical prior art Bourdon tube sensors for use in deep bore holes.

One method of transmitting well fluid pressure to the hydraulic liquid in the Bourdon tube is to contact the well fluids with an extensible bellows, the interior of which is filled with a clean hydraulic liquid and placed in fluid communication with the Bourdon tube. The outside of the bellows contacts the well fluids so that pressure of the well fluid is communicated to the Bourdon tube through the bellows and enclosed hydraulic liquid.

Standard Bourdon tube assembly ordinarily are filled with a liquid such as triethylene glycol, which outgasses at temperatures above 350 degrees Fahrenheit. Outgassing of the liquid in the Bourdon tube seriously degrades instrument accuracy so that it is difficult to obtain meaningful pressure measurements in well bores having ambient temperatures above 350 degrees Fahrenheit. If a bellows is used to transmit well fluid pressures to the Bourdon tube, outgassing of the fluid causes the bellows to expand; and if the temperature is sufficiently high, outgassing of the fluid will rupture the bellows.

SUMMARY OF THE INVENTION

The present invention provides an apparatus and a method for filling a Bourdon tube with a fluid that, under proper conditions, exhibits no appreciable outgassing at temperatures up to approximately 750 degrees Fahrenheit. The invention includes the use of a liquid having a high boiling point in an ordinary Bourdon tube. A suitable hydraulic liquid is a form of modified terphenyl sold by Monsanto Industrial Chemical Company under the trademarks Therminol 66 and Santotherm Heat Transfer Fluids. The thermal expansion of the liquid is directly proportional to the volume thereof. The preferred hydraulic fluid does not begin to bubble until it is heated to approximately 625 degrees Fahrenheit. Because of initial outgassing, the fluid must be placed under a vacuum at about 300 degrees Fahrenheit before it is usable to provide an instrument of the desired accuracy over the temperature ranges encountered in deep bores. This invention provides a filling device and method for ensuring that the fluid is sufficiently outgassed before it is put into the Bourdon tube. The invention heats and evacuates the fluid and Bourdon tube simultaneously while maintaining a barrier of cool fluid over the heated fluid to prevent is exposure to oxygen, thereby reducing oxidation of the fluid.

The invention includes a bellows arrangement having a fill port that is sealed with a fill plug when the instrument is in use. The fill plug is ordinarily threadedly engaged in a cap that encloses one end of the bellows. Before filling, the length of the bellows is reduced by mechanical compression from a length of about 5¼ inches, a standard bellows length, to about 3¾ inches. The bellows includes a center post that serves as a guide for the bellows and which fills a portion of the volume thereof. The centerpost is formed of a material such as stainless steel, which experiences negligible outgassing at temperatures of up to about 750 degrees Fahrenheit. In order to fill the Bourdon tube, the plug is removed and the filling device is then threadedly engaged in the fill port. The filling device includes a hot reservoir which contains a supply of the hydraulic fluid adjacent the fill port. A valve in the filling device controls fluid flow through a passage between the filling device and the bellows. The hot reservoir preferably contains a supply of the hydraulic fluid sufficient to fill the Bourdon tube and the bellows. A vacuum line is connected to the cold reservoir above the level of the hydraulic fluid in the cold reservoir to outgas the hydraulic fluid and to evacuate the bellows and Bourdon tube. A heating shield is connected to the filling apparatus between the cold and hot reservoirs to form an air space around the hot reservoir, the bellows and the Bourdon tube. The air space is heated to facilitate outgassing of the fluid and to remove impurities from the Bourdon tube and bellows. After the outgassing of the hydraulic fluid and the heating of the Bourdon tube and bellows have been accomplished, the vacuum is removed while the valve in the hot reservoir is open to allow the fluid to flow into the bellows and Bourdon tube. After the Bourdon tube is filled, the filling apparatus is removed from the fill port, which is then plugged to prevent leakage.

BRIEF DESCRIPTION OF THE DRAWINGS

FIG. 1 is a cross-sectional view of a Bourdon tube and bellows assembly for measuring pressures in a well bore; and FIG. 2 is a partial cross-sectional view illustrating apparatus used to fill the bellows and Bourdon tube of FIG. 1 with an outgassed fluid.

DESCRIPTION OF THE PREFERRED EMBODIMENT

Referring to FIG. 1, a typical temperature measuring instrument 10 includes a helically wound Bourdon tube 12 having a closed end 14 and an open end 16, which is in fluid communication with a bellows 18 through a shield connector 20. The shield connector 20 is of a generally hollow elongate cylindrical construction having external threads at each end for connection to other apparatus (not shown) used in connection with the bellows 18 and Bourdon tube 12.

A solid rod, or center post 22 placed in the shield connector 20 extends into the bellows 18. The center post 22 serves as a guide for the bellows 18 and fills part of the space therein to reduce the amount of fluid required to fill the bellows 18 and the shield connector 20. The center post 22 is preferably formed of stainless steel to prevent outgassing in the temperature range of interest, which includes wellbore temperatures of up to 750 degrees Fahrenheit.

The bellows 18 terminates in a cap 24, which has a longitudinal passage 26 therethrough. The cap 24 also includes a fill port 28 which is in fluid communication with the passage 26. A plut 30 seals the fill port 28 when the instrument for the measuring apparatus 10 is filled with a working fluid or is in use.

When the pressure measuring apparatus 10 is in use, the well fluid pressure is applied to the cap 24, which transmits the pressure to the working fluid in the Bourdon tube 12. Increasing the fluid pressure in the Bourdon tube causes the tube 12 to unwind and drive a stylus (not shown) connected to the closed end 14 from an equilibrium position at ambient atmospheric pressure to indicate the pressure in the well bore.

It has been found that accurate pressure measurements at high temperature require the use of a working fluid which does not boil or experience appreciable outgassing at the temperature in the well bore. In order to assure the desired accuracy of pressure measurement, the working fluid must not boil or outgas over temperatures ranging from ambient atmospheric temperatures up to about 750 degrees Fahrenheit. The inventor has found that a high performance heat transfer fluid, which is a modified terphenyl sold by Monsanto Industrial Chemical Company under the trademarks Therminol 66 and Santotherm Heat Transfer Fluids is a particularly suitable working fluid for pressure measurements at high temperatures. Although Therminol 66 is a preferred working fluid for high temperature, high pressure applications, any substance having the essential outgassing and temperature-pressure-volume characteristics discussed herein is satisfactory.

Therminol 66 is an essentially colorless, oily liquid having a faint characteristic oder. The substance has a pour point of $-18$ degrees Fahrenheit, a thermal expansion that is essentially linear, a density at 75 degrees Fahrenheit of about 8.35 pounds per gallon, a flash point of 355 degrees Fahrenheit, or 180 degrees Celsius, a fire point of 382 degrees Fahrenheit, or 194 degrees Celsius and a boiling point of approximately 625 degrees Fahrenheit at atmospheric pressure. The substance is virtually non-toxic and non-irritating, posing no special handling problems. It is not absorbed through the unbroken skin in significant quantities, and is non-irritating to the skin and is only mildly irritating if eye contact occurs. Therefore, under ordinary conditions there are no special handling procedures that must be observed with the working fluid. At room temperatures, there is no vapor exposure problem when transferring the fluid from a shipping container into the filling apparatus 32 of the present invention. However, vapors emitted at high temperatures may be mildly irritating under prolonged exposure. In the present invention, the working substance is maintained in essentially leak-free containers so that there should be little or no opportunity for workers to come in contact with vapors.

Referring to FIG. 2, a filling mechanism 32 has a projection 34 threadedly engaged in the fill port 28. The filling apparatus 32 includes a hot reservoir 38 from which the projection 34 extends, a cold reservoir 40 in fluid communication with the hot reservoir 38 through a neck 42 and a heater shield 44 connected to the neck 42. The heater shield 44 may conveniently be of a generally cylindrical configuration having length and diameter sufficient to enclose the Bourdon tube 12, the shield connector 20, the bellows 18, the hot reservoir 38, and a portion of the neck 42. The hot reservoir 38, the bourdon tube and the bellows 18 are placed in a heater chamber 51.

The hot reservoir 38 and the neck 42 are preferably formed of a suitable metal such as stainless steel that is capable of withstanding temperatures up to at least 300 degrees Fahrenheit. The cold reservoir 40 preferably includes a bottom surface 41 formed of the same material as the hot reservoir 38 and the neck 42. The bottom surface 41 preferably has a threaded lip 43 extending perpendicularly therefrom; and a threaded, generally cylindrical portion 45 is mounted upon the lip 43. The cylindrical portion 45 is preferably formed of a transparent plastic substance to permit visual monitoring of the level 47 of working fluid in the filling apparatus 32. The heater shield 44 is preferably formed of the same metal as the neck 42 and may be conveniently connected thereto by a weldment 49. The heater shield 44 serves to prevent appreciable heat transfer from the heater chamber 52 to the plastic portion 45.

The cold reservoir 40 may also conveniently be of a generally cylindrical configuration. The cold reservoir 40 has an end 46 that is covered by a cap 48 and a vacuum outlet 50 from which a vacuum line 52 extends. An elongate rod 54 having a conical end 56 extends through a passage 58 in the cap 48 so that the conical end 56 is adjacent a correspondingly shaped recess 60 of the inside of the projection 34. The passage 58 through the cap 48 is preferably threaded and a portion of the rod 54 is also threaded so that rotation of the rod 54 selectively engages or disengages the conical end 56 of the rod 54 with the conical recess 60 in the projection 34. The conical projection 56 on the rod 54 and the conical recess 60 in the plug 34 cooperate to function as a valve 61 so that rotating the rod 54 a sufficient distance to seat the conical projection 56 in the recess 60 prevents fluid flow from the hot reservoir 38 into the passage 26 and thus into the bellows 18 and the Bourdon tube 12.

The rod 54 has an end 62 projecting out of the cap 48. The end 62 preferably has a knob 64 mounted thereto to facilitate rotation of the rod 54 to selectively seat or unseat the conical projection 56 in the recess 60.

When the filling apparatus 32 is used to fill the bellows 18 and the Bourdon tube 12, the projection 34 may be first threadedly engaged in the fill port 24 and the rod 54 is rotated so that the conical projection 56 engages the recess 60 to seal the opening 28 into the projection 34. The working fluid for filling the bellows 18 and Bourdon tube 12 is put into the cold reservoir 40 so that the level 47 of the fluid is below that of the vacuum as seen through the cylindrical portion 25. The working fluid completely fills the hot reservoir 38 and the neck 42. The working fluid may be conveniently supplied to the cold reservoir through the vacuum inlet 50 before connection of a vacuum pump (not shown) thereto.

After the desired amount of working fluid is inserted into the filling apparatus 32, the vacuum line 32 is connected to a pumping apparatus (not shown), which evacuates the bellows 18 and the Bourdon tube 12, which causes the bellows 18 to contract somewhat. The valve 61 is open so that the vacuum is applied to the bellows 18 and the Bourdon tube 12. The Bourdon tube 12, the bellows 18, the hot reservoir 38 and the heat shield remain in a heated air chamber (not shown) for about 20 minutes or more at a temperature of approximately 300 degrees Farenheit under vacuum to evacuate the bellows 18 and Bourdon tube 12 and to outgas the fluid in the hot reservoir 38. Heating the working fluid under vacuum causes the fluid to be sufficiently outgassed to provide the desired accuracy in pressure measurements. Maintaining a long fluid passage, such as the neck 42, between the hot reservoir 38 and the cold reservoir 40 causes a cover of relatively cold filling fluid to be maintained above the hot fluid, thereby preventing oxidation of the heated fluid.

The vacuum prevents the heated fluid from flowing into the bellows 18 and Bourdon tube 12. After the heated fluid has been sufficiently outgassed, the vacuum is turned off, and the fluid is allowed to flow into the bellows 18 and Bourdon tube 12. Once the bellows 18 and Bourdon tube 12 have been filled, the assembly is removed from the hot chamber, and the filling assembly 32 is disconnected from the fill port 28 of the bellows 18, and the plug 30 is inserted into the fill port 28 to seal the outgassed working fluid in the Bourdon tube 12 and bellows 18.

A preferred detailed procedure for filling the bellows 18 and Bourdon tube 12 with the working fluid is described below. It is to be understood that those skilled in the art might follow a different sequence of steps and might place some steps with other equivalent steps.

The length of a standard bellows is reduced by mechanical compression by use of a conventional vise or the like (not shown) from a typical valve of about 5¼ to 3¾ inches. The combination of the compression of the bellows 18 and inclusion of the center post 22 therein reduces the volume of a typical bellows by about fifty percent from 27.25 cc to about 14 cc. Over the temperature range of interest, the bellows 18 has a length expansion of about one inch. Even though the total volume of the system including the Bourdon tube 12 and the bellows 18 varies with the specific gauge and pressure range, the filling 10 apparatus and method provide acceptable expansion in all pressure ranges typically encountered in wellbore pressure measurement applications.

The air bath is heated to approximately 300 degrees Farenheit. The filling assembly 32 should be dimensioned so that if it is filled approximately one-third full with the working fluid, preferably Therminol 66 as explained above, the filling assembly 32 will contain sufficient fluid to fill the bellows 18 and Bourdon tube 12. When the filling assembly 32 has required amount of working fluid therein, the projection 34 is threadedly engaged in the fill port 28 with the valve 61 being closed. With the vacuum pump power being off, a suitable hose (not shown) is connected between the vacuum line 52 and the vacuum pump. After connecting the vacuum line 52 to the vacuum pump, the knob 64 is turned a sufficient amount, such as five full turns to open the valve 61. The vacuum pump is then turned on and allowed to remain on until a vacuum of 25 inches of mercury is achieved in the filling apparatus. After the desired vacuum is obtained, the vacuum pump is turned off for five to ten seconds or until the filling fluid ceases to bubble. After the bubbling has ceased, the vacuum pump is turned on until a vacuum of approximately 28 inches of mercury is achieved, after which the vacuum pump is turned off again for 5–10 seconds. The vacuum pump is then reactivated until the vacuum reaches 30 inches of mercury, at which time the vacuum pump is turned off until the bubbling subsides. The vacuum pump is then turned on and the filling apparatus is evacuated for five minutes while approximately once each minute the bellows is extended by about 0.5 inch and moved with a slight rotary motion. After the 5 minute evacuation period, the vacuum hose should be removed for approximately 30 seconds and then replaced for about 2 minutes while the bellows is extended and rotated slightly.

The vacuum hose should then be removed after the 2 minute period and the filling apparatus 32 with the bellows 18 attached thereto placed into a 300 degree Fahrenheit air bath for about 20 minutes. After the filling apparatus 32 is removed from the air bath, the system is again evacuated for about 10 minutes while pulling, rotating, and tapping on the Bourdon tube 12.

After the 10 minute evacuation period, the vacuum should be removed for approximately 30 seconds and then replaced for another 10 minutes while the assembly is allowed to remain stationary. After the second 10 minute evacuation period, the vacuum hose should be removed from the vacuum line 52 and the entire filling apparatus 32, bellows 18, and Bourdon tube 12 should be cooled with water. All water should be blown away from the fill port 26 before the projection 34 is disengaged therefrom.

With the Bourdon tube 12 being held in a vise or other suitable apparatus, the bellows 18 should be disconnected from the filling apparatus 32. The bellows 18 should then be held at a predetermined length and the plug 30 should be secured in the fill port 26 with a suitable washer (not shown), if necessary, being positioned between the bellows cap 24 and the plug 30.

The bellows 18 and the Bourdon tube 12 when filled as described herein may be used to measure well bore pressures at temperatures of up to 600 degrees Fahrenheit without special precautions. If pressures of 500 psi or more are maintained on the bellows 18 and Bourdon tube 12 while the temperature exceeds 600 degrees Fahrenheit, they may be used for pressure measurements at temperatures up to 750 degrees Fahrenheit.

Although the present invention has been described with reference to particular apparatus and process steps, it will be understood by those skilled in the art that numerous modifications may be made without departing from the scope and spirit of the invention. Accordingly, all modifications and equivalents which are properly within the scope of the appended claims are included in the present invention.

INDUSTRIAL APPLICATION

The present invention has application wherein it is necessary to fill a container, tube, or other enclosed volume with an outgassed fluid. The present invention is particularly useful in preparing Bourdon pressure gauges for use in pressure measurements in deep well bores.

What is claimed is:

1. A method for filling a Bourdon tube or the like through a fill port with a hydraulic fluid for pressure sensing applications at high temperatures, comprising the steps of:
   (a) placing a predetermined amount of the hydraulic fluid in a filling apparatus;
   (b) mounting the filling apparatus to the fill port;
   (c) applying a vacuum to the filling apparatus to evacuate the Bourdon tube and to outgas the hydraulic fluid through a vacuum outlet; and
   (d) heating the Bourdon tube and hydraulic fluid to a predetermined temperature while the vacuum is applied thereto to enhance the outgassing of the hydraulic fluid.

2. The method of claim 1 wherein step (a) includes the step of placing a sufficient amount of hydraulic fluid in the filling apparatus to fill the Bourdon tube while maintaining the hydraulic fluid at a level to prevent hydraulic fluid from flowing out of the filling apparatus through the vacuum outlet.

3. The method of claim 1, further comprising the step of:
   forming the filling apparatus to have a hot reservoir for holding an amount of hydraulic fluids sufficient to fill the Bourdon tube in thermal communication with a heat source and a cold reservoir in fluid communication with the hot reservoir for isolating the hydraulic fluid in the hot reservoir from oxygen to prevent oxidation of the hydraulic fluid; and placing the vacuum outlet in the cold reservoir.

4. The method of claim 3, further including the step of providing a valve in the hot reservoir to control fluid communication between the hot reservoir and the Bourdon tube.

5. The method of claim 4, further including the steps of:
   placing a bellows between the hot reservoir and the Bourdon tube;
   evacuating the bellows through the vacuum outlet in the cold reservoir; and
   filling the evacuated Bourdon tube and bellows with the outgassed hydraulic fluid.

6. The method of claim 5, further including the step of compressing the bellows to decrease the length thereof by a predetermining amount before filling the bellows and Bourdon tube with the outgassed hydraulic fluid.

7. The method of claim 1, further including the steps of:
   sealing the fluid outlet of the filling apparatus with a valve while placing hydraulic fluid in the filling apparatus; and
   opening the valve to place the filling apparatus in fluid communication with the Bourdon tube after application of the vacuum to the filling apparatus.

8. The method of any preceding claim further including the step of heating the Bourdon tube and fluid in the hot reservoir to a temperature of approximately 300 degrees Fahrenheit.

9. An apparatus for filling a Bourdon tube or the like with a hydraulic fluid through a fill port for pressure sensing applications at high temperatures, comprising:
   a housing having a vacuum outlet and a hydraulic fluid outlet;
   means for placing the hydraulic fluid outlet in the fluid communication with the fill port of the Bourdon tube;
   means for applying a vacuum to the housing to evacuate the interior thereof and to evacuate the Bourdon tube through the fill port;
   means for controlling the flow of hydraulic fluid from the interior of the housing into the Bourdon tube; and
   means for heating a portion of the housing to heat the hydraulic fluid therein to a predetermined temperature to outgas the hydraulic fluid.

10. The apparatus of claim 9 wherein the housing includes a hot reservoir, a cold reservoir and a conduit for conducting fluids between the cold reservoir to the hot reservoir, further comprising means for heating hydraulic fluid in the hot reservoir to a predetermined temperature to facilitate outgassing of the hydraulic fluid while fluid in the conduit and cold reservoir prevents exposure of the heated hydraulic fluid to oxygen to prevent oxidation of the heated hydraulic fluid.

11. The apparatus of claim 9 wherein:
    the cold reservoir includes a cap on one end thereof, the cap having a threaded passage therein; and
    a shaft extending through the passage and threadedly engaged therewith, the shaft extending through the cold reservoir, the conduit and the hot reservoir and having an end configured to seat against a portion of the housing surrounding the fluid outlet to form a valve for controlling fluid flow between the filling apparatus and the Bourdon tube.

12. The apparatus of claim 9 wherein the housing includes a transparent portion that permits visual monitoring of the hydraulic fluid level therein.

13. A method for filling a Bourdon tube with a hydraulic fluid comprising the steps of:
    a. forming a housing having first and second chambers, said chambers being in fluid communication with each other and vertically displaced with respect to each other;
    b. introducing hydraulic fluid into the housing such that said first chamber is filled with said fluid and said second chamber is at least partially filled with said fluid;
    c. connecting a Bourdon tube to an outlet port of said first chamber;
    d. evacuating said housing by applying a vacuum to said housing at a location within said second chamber;
    e. disposing said first chamber within a heater assembly so as to heat and outgas the fluid disposed therein;
    f. opening said housing outlet port so as to place said tube in fluid communication with said evacuated housing; and
    g. releasing said vacuum to allow the outgassed fluid within said first chamber to discharge into said Bourdon tube.

14. An apparatus for filling a Bourdon tube or the like with hydraulic fluid through a fillport, comprising:
    a. a housing having first and second fluid chambers, said first and second chambers being in fluid communication and vertically displaced from each other, said first chamber and at least a portion of said second chamber being filled with a hydraulic fluid, said second chamber having a vacuum port connectable to a vacuum source, and said first chamber having a hydraulic fluid outlet;
    b. means for placing said hydraulic fluid outlet in fluid communication with a fillport of the Bourdon tube;

c. means for applying a vacuum to said port to evacuate the interior of said housing and to evacuate the Bourdon tube through the fillport;

d. means for heating said first chamber of said evacuated housing so as to facilitate outgassing of the fluid disposed in said first chamber; and e. means for discharging the outgassed fluid in said first chamber into the Bourdon tube.

* * * * *